United States Patent [19]

Kameyama et al.

[11] Patent Number: 5,777,828
[45] Date of Patent: Jul. 7, 1998

[54] MAGNETIC ALLOY AND MAGNETIC HEAD HAVING AT LEAST A PART MADE OF THE MAGNETIC ALLOY

[75] Inventors: Makoto Kameyama, Chiba-ken; Masaaki Matsushima, Kanagawa-ken; Michio Yanagi, Saitama-ken, all of Japan

[73] Assignee: Canon Kabushiki Kaisha, Tokyo, Japan

[21] Appl. No.: 627,266

[22] Filed: Apr. 4, 1996

[30] Foreign Application Priority Data

Apr. 11, 1995 [JP] Japan ................................ 7-084988

[51] Int. Cl.$^6$ ............................ G11B 5/147; H01F 10/00
[52] U.S. Cl. .......................... 360/126; 148/306; 420/10; 420/26; 420/28; 420/82; 428/457; 428/692; 428/900
[58] Field of Search ........................... 360/126; 148/306; 420/10, 26, 28, 82; 428/457, 692, 900

[56] References Cited

U.S. PATENT DOCUMENTS 5,478,416  12/1995  Takaoka et al. .................. 148/306
5,522,948   6/1996  Sawa et al. ...................... 148/308

FOREIGN PATENT DOCUMENTS 04139805  5/1992  Japan .

Primary Examiner—Stevan A. Resan
Attorney, Agent, or Firm—Robin, Blecker & Daley

[57] ABSTRACT

A magnetically soft thin-film is prepared either to be of a composition wherein Fe is used as a principal component, and 0.5 to 20 atomic % of Al, 2 to 25 atomic % of at least one of Zr, Hf, Nb, Ta, Mo and W, 0.05 to 5 atomic % of at lease one of Ag and Cu, 0.5 to 25 atomic % of C and 0.2 to 8 atomic % of O are added as additional elements to the principal component, or to be of a composition wherein 0.1 to 5 atomic % of at least one of rare earth elements such as Ce, Sm and Dy is added further to the above-stated composition. These compositions enable the magnetically soft thin-film to have excellent properties as desired for a magnetic head.

16 Claims, 3 Drawing Sheets

MAGNETIC ALLOY AND MAGNETIC HEAD HAVING AT LEAST A PART MADE OF THE MAGNETIC ALLOY

BACKGROUND OF THE INVENTION

1. Field of the Invention

This invention relates to a magnetic alloy which has a high saturation magnetic flux density, a high permeability and a high thermal resistance and which yet excels in corrosion resisting property, and also relates to a magnetic head which is made of the magnetic alloy.

2. Description of the Related Art

In the field of magnetic recording, efforts are being exerted these days for high density recording and short wavelength recording. For this purpose, a magnetic recording medium is required to have a high coercive force and a high residual magnetic flux density. As to a magnetic head, a so-called metal-in-gap head which is capable of adequately recording on a magnetic recording medium having a high coercive force has come to be noted with interest. The metal-in-gap head has a magnetically soft metal thin-film of a high saturation magnetic flux density formed on the confronting faces of magnetic core halves which are opposed to each other through a magnetic gap.

Since a high temperature process called glass bonding is necessary for making the metal-in-gap head, the magnetically soft thin-film must have a high thermal stability.

As the magnetically soft thin-film having a high thermal stability, there are known a Sendust alloy, a Co-based noncrystal alloy, and a thin film containing a relatively large amount of carbon, such as an alloy of a composition expressed as Fe (Ti, Zr, Hf, Nb, Ta, Mo, W) C, wherein at least one of elements within the parentheses is to be employed, as disclosed in Japanese Laid-Open Patent Application No. HEI 3-20444.

It is also known to use a magnetic thin-film containing N and O, such as an Fe-N-based magnetically soft thin-film expressed as Fe (Al, Ga, etc.) —N —O, as disclosed in Japanese Laid-Open Patent Application No. HEI 3-232206.

The corrosion resistance of these magnetically soft thin-films was evaluated by subjecting them to air-conditioned tests and salt spray tests. According to the results of the evaluation tests, the corrosion resistance of the Co-based noncrystal alloy and that of the Sendust alloy are relatively good. However, the values of their saturation magnetic flux density obtained by such compositions that give good magnetically soft properties are 1.0 to 1.3 T, which are relatively low values.

On the other hand, the magnetic alloys which contain carbon, nitrogen and oxygen in relatively large amounts and which can be expressed as (Fe, Co) (Ti, Zr, Hf, Nb, Ta, Mo, W) C, (Fe, Co) (Ti, Zr, Hf, Nb, Ta, Mo, W) N, and Fe (Al, Ga) —N —O, respectively show high saturation magnetic flux density values of 1.3 to 1.8 T at such compositions that give good magnetically soft properties. However, despite of their high saturation magnetic flux density these alloys present a problem in respect of corrosion resistance. They tend to corrode while they are in process of making magnetic heads. Besides, when the heads are subjected to recording-and-reproduction tests over a long period of time, the reproduction outputs decrease due to the corrosion of the films. The magnetic heads made of these alloys lack practicability and are hardly acceptable as commercial products.

In an attempt to solve these problems, if Ni, Cr, Ru, Rh or the like is added as disclosed in Japanese Laid-Open Patent Application No. HEI 3-19545 and Japanese Laid-Open Patent Application No. HEI 3-265105, the corrosion resistance can be improved. However, if the addition amount of any of these elements is increased for further improvement on the corrosion resistance, magnetostriction shifts to a positive side, thereby making it impossible to obtain a film of low magnetostriction. In the case of a system requiring a high C/N (carrier output/noise) ratio, a sliding noise or induced anisotropy due to magnetostriction might present a problem.

SUMMARY OF THE INVENTION

To solve the problems of the prior art described above, it is an object of this invention to provide a magnetic alloy which gives a film having such an excellent corrosion resisting property that equals that of a Sendust thin-film, has a good magnetically soft property and a high saturation magnetic flux density and yet has a low magnetostriction. It is another object of this invention to provide a high-performance magnetic head which is made of the above-stated magnetic alloy.

To attain the objects mentioned above, a magnetic alloy prepared in accordance with this invention as an embodiment thereof is made of a magnetically soft material of a composition expressed by the following composition formula:

$$Fe_a Ml_b MI_c MII_d C_e O_f$$

where a, b, c, d, e and f respectively represent values of composition ratio in atomic percentage, MI represents at least one of elements Zr, Hf, Nb, Ta, Mo and W, MII represents at least one of elements Ag and Cu, and the values a, b, c, d, e and f satisfy the following conditions:

$a+b+c+d+e+f=100$ $0.5 \leq b \leq 20$ $2 \leq c \leq 25$ $0.05 \leq d \leq 5$ $0.5 \leq e \leq 25$ $0.2 \leq f \leq 8$ To attain the object from another viewpoint, a magnetic alloy prepared in accordance with this invention as another embodiment thereof comprises a magnetically soft material of a composition expressed by the following composition formula:

$$Fe_a Ml_b MI_c MII_d C_e O_f L_g$$

where a, b, c, d, e, f and g represent values of composition ratio in atomic percentage, MI represents at least one of elements Zr, Hf, Nb, Ta, Mo and W, MII represents at least one of elements Ag and Cu, L represents at least one of rare earth elements, and the values a, b, c, d, e, f and g satisfy the following conditions:

$a+b+c+d+e+f+g=100$ $0.5 \leq b \leq 20$ $2 \leq c \leq 25$ $0.05 \leq d \leq 5$ $0.5 \leq e \leq 25$ $0.2 \leq f \leq 8$ $0.1 \leq g \leq 5$ Further, in accordance with this invention, a magnetic head can be arranged to have an extremely high performance by using the above-stated magnetic alloy for a part of the magnetic core of the magnetic head.

The above and other objects and features of this invention will become apparent from the following detailed description of embodiments thereof taken in connection with the accompanying drawings.

DETAILED DESCRIPTION OF THE PREFERRED EMBODIMENTS

Figure 1:
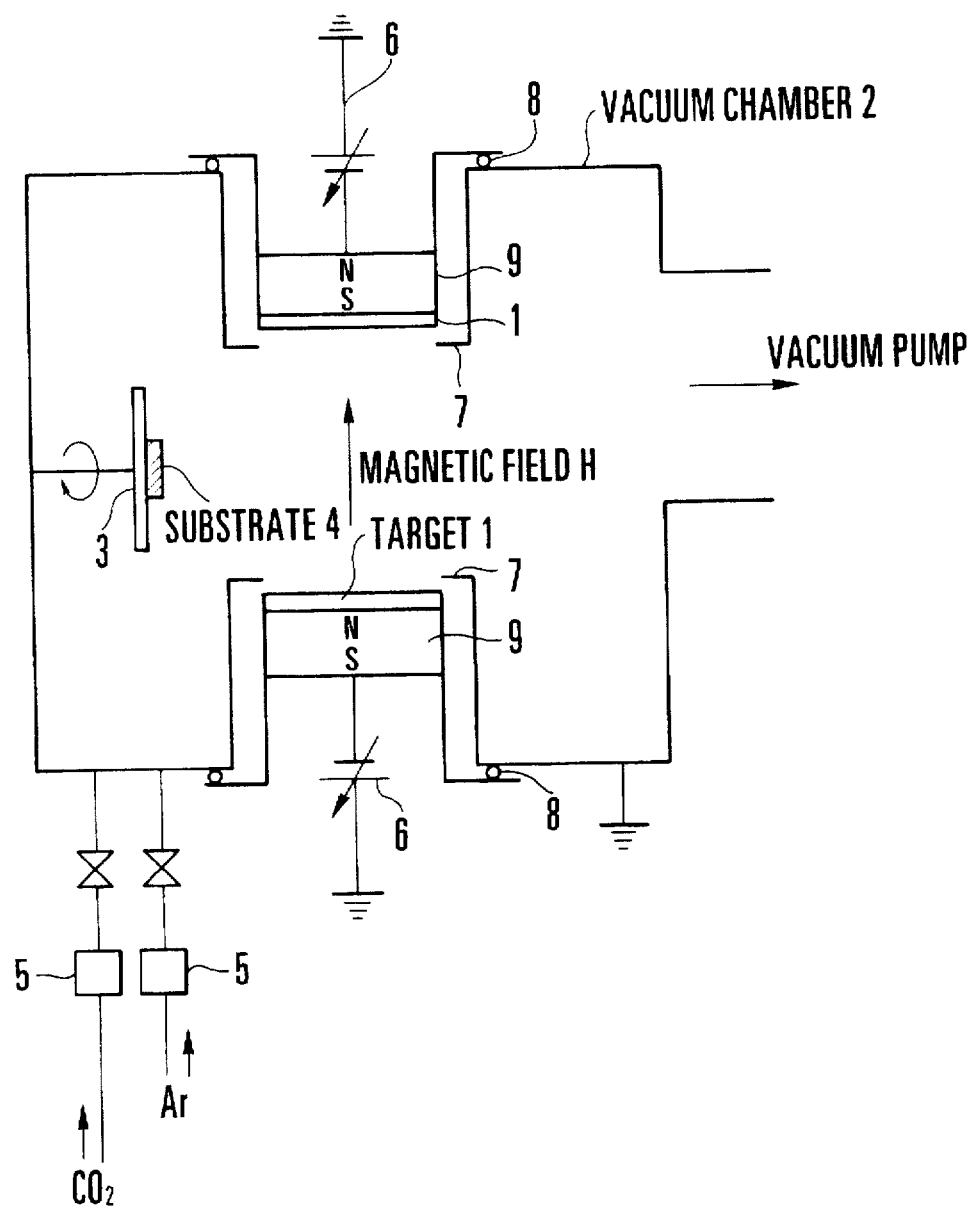
FIG. 1 is a schematic illustration of the arrangement of a sputtering device to be used in forming magnetically soft thin-films as embodiments of this invention.

Embodiments of this invention are described below with reference to the accompanying drawings.

A magnetically soft thin-film prepared according to this invention is first described as follows.

The inventors of this invention prepared magnetically soft thin-films made of magnetically soft materials obtained by adding various elements to "Fe M (elements of groups IVa, Va and VIa) C O", and conducted researches for a composition which would give a good magnetically soft property and a low magnetostriction and which yet would show a good corrosion resisting property.

As a result, it was found that a magnetically soft thin-film which is either of a composition in which at least one of elements Zr, Hf, Nb, Ta, Mo and W is used as the element M (hereinafter will be referred to as MI) and at least one of Cu and Ag and Al are added in a suitable quantity, or of a composition in which at least one of rare earth elements such as Ce, Sm and Dy is added further to the above-stated composition, would not only give a low magnetostriction and a good magnetically soft property but also show an excellent corrosion resisting property. The addition of at least one of Ag and Cu and Al was found to enhance the corrosion resistance without bringing about much changes in coercive force and magnetostriction. The further addition of the rare earth element such as Ce, Sm or Dy was found to further enhance the corrosion resistance. This effect seems to derive from the fact that these elements Al, Cu, Ag, Ce, Sm, Dy, etc., directly act on Fe to prevent Fe from oxidizing.

The preferred amounts of addition of these elements were found as follows. Al is added 0.5 to 20 atomic %, MI is added 2 to 25 atomic %, at least one of Ag and Cu is added 0.05 to 5 atomic %, C is added 0.5 to 25 atomic %, and O is added 0.2 to 8 atomic %. In a case where at least one of such rare earth elements as Ce, Sm, Dy, etc., is added, the rare earth element is added 0.1 to 5 atomic %.

These amounts of addition are decided for the following reason. With regard to the element Al, a range of amounts by which the corrosion resistance can be enhanced without affecting the magnetic property of the thin film is from 0.5 to 20 atomic % and, more preferably, is from 1 to 10 atomic %. An amount of addition of Al more than 20 atomic % causes too much magnetostriction, exceeding "$30 \times 10^{-7}$", and also lowers the saturation magnetic flux density Bs. Further, an amount of addition of Al less than 0.5 atomic % would show no improvement in corrosion resisting property at all.

The addition of MI and C serves to create microcrystals of carbides which effectively suppress the granular growth of Fe and thus serves to retain the magnetically soft property even at a high temperature. However, this advantageous effect is hardly attainable if the amounts of addition of MI and C are less than 2 atomic % and 0.5 atomic %, respectively. If the amounts of addition of MI and C respectively exceed 25 atomic %, it becomes impossible to obtain a good magnetically soft property. Besides, the saturation magnetic flux density Bs becomes lower. Therefore, the amounts of addition of MI and C are set at the ranges indicated above. More preferably, however, the amount of addition of MI is set at a range from 3 to 15 atomic % and that of C is also set at a range from 3 to 15 atomic %.

As for Ag and Cu, if the amounts of addition of Ag and Cu are less than 0.05 atomic %, an improvement in magnetic property and corrosion resistance becomes hardly attainable. If their amounts of addition exceed 5 atomic %, the magnetic property would be deteriorated. The addition of Ag and Cu seems to serve to improve the magnetic property by making the crystal grain size of the alloy smaller.

The addition of O not only serves to improve a high frequency characteristic by raising electric resistance, but also, along with the addition of Al, (Ag, Cu) and (Ce, Sm, Dy or the like), plays a role of improving corrosion resistance. However, an amount of addition of O less than 0.2 atomic % fails to give such advantages. An amount of addition of O exceeding 8 atomic %, on the other hand, deteriorates the magnetically soft property.

The addition of the rare earth element such as Ce, Sm, Dy or the like improves the corrosion resistance. This effect, however, cannot be attained by an amount of addition less than 0.1 atomic %. An amount of addition exceeding 5 atomic % deteriorates the magnetically soft property.

To examine the compositions of the magnetically soft thin-films described above, magnetically soft thin-films were formed in various compositions and subjected to tests. The following describes how these thin films were formed, and shows the results of the tests.

In an attempt to find a suitable composition, magnetically soft thin-films were prepared by adding various elements to "Fe M (elements of groups IVa, Va and VIa) C O" as mentioned above. The magnetically soft thin-films were prepared by sputtering with an opposed-target type sputtering device arranged as shown in FIG. 1.

Referring to FIG. 1, a mixed gas consisting of an Ar gas and a $CO_2$ gas is introduced through a mass flow meter 5 into a vacuum chamber 2. The sputtering process is carried out in the atmosphere of the mixed gas. Targets 1 are disposed in parallel to each other in an opposed state within the vacuum chamber 2. A negative potential is applied to each of the opposed targets 1 from a DC power source 6 to ionize the mixed gas of the above-stated atmosphere. The ionized gas is accelerated by a negative electric field to come into collision with each of the targets 1, thereby sputtering the targets 1. At this moment, a plasma of the ionized gas is converged by a magnetic field H generated by a magnet (a rare earth magnet, for example) 9 disposed behind each of the targets 1. By virtue of this plasma, a thin film of a composition corresponding to the targets 1 is efficiently formed at a high speed on a substrate 4 which is held by a rotary substrate holder 3 within the vacuum chamber 2. Incidentally, the sputtering device further includes target shields 7 and insulating vacuum seal parts 8.

The sputtering process was carried out under the following condition.

Sputtering gas: Ar+$CO_2$

Gas pressure at the time of sputtering: 0.93 Pa

Making power: 3 KW

Temperature of the substrate: ~100° C.

Alloy targets and sintered targets were used as the targets 1. In a case where a rare earth element was added, a chip measuring "5×5×1 mm" was placed on the targets 1. As for the substrate 4, crystallized glass (manufactured by HOYA Glass Co., PEG 3130C) measuring "10×10×1 mm" was used.

The film was formed by sputtering 5 μm in the atmosphere of Ar+$CO_2$. After film forming, the film is subjected to a heat treatment at 550° C. in vacuum for one hour. The samples of various magnetically soft thin-films formed in this manner were subjected to magnetic property measuring tests and corrosion resistance tests. The results of the tests are as shown in Table 1 below.

The composition of each thin-film sample shown in Table 1 below was analyzed by an E.P.M.A. method (an X-ray microanalyzer method). For carbon, in particular, a combustion infrared absorption method was used. The saturation magnetic flux density Bs and the coercive force Hc of each sample were measured by cutting the sample to a size of "2.5×2.5×1.0 mm" and by using a V.S.M. (a sample vibrating type fluxmeter). A yoke method was used for measuring permeability μ. The corrosion resistance test was carried out in the following manner. An oxidized surface layer due to the heat treatment of each thin-film sample was removed by dry etching. After that, the substrate having the thin film attached was immersed in an aqueous solution of 0.9% NaCl. Then, after the lapse of 100 hours in an atmosphere of 23° C., a change in volume was detected from the residual rate of saturation magnetization Ms by the V.S.M. The result of this is expressed as follow.

Residual rate of Ms=("Ms after 100 H"/"initial Ms")×100.

Figure 2:
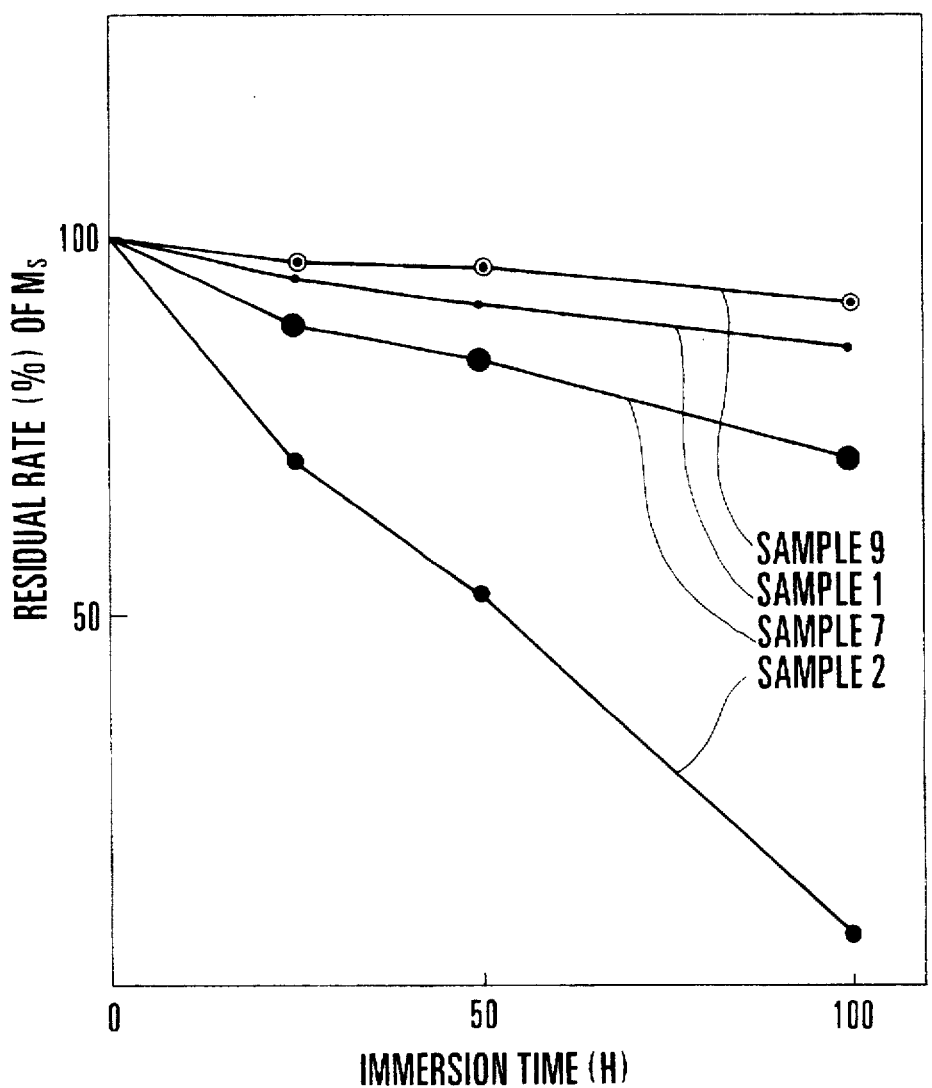
FIG. 2 is a graph showing results of corrosion resistance tests conducted on samples embodying this invention and samples used for comparison.

The residual rates of saturation magnetization Ms of representative samples in relation to time are shown in a graph in FIG. 2.

Samples 3 and 4 are films formed by respectively adding Cr and Ru to the film of the sample 2. The addition of them improves corrosion resistance but results in a greater magnetostriction measuring $20\times10^{-7}$ to $50\times10^{-7}$.

Samples 5 and 6 are films formed by adding Al to the film of the sample 2. The addition of Al improves corrosion resistance. However, any amount of addition that gives the same corrosion resistance improving effect as the Sendust film increases the magnetostriction to $30\times10^{-7}$.

Samples 7 and 8 are of compositions which are defined according to this invention, in which Ag or Cu is added with the amount of Al fixed to 9.5 atomic %. The addition of Ag or Cu increases the permeability which is a magnetic property up to 4500 which is much greater than that of the Sendust sample 1. Corrosion resistance is also improved. By the addition, little change is caused in the magnetostriction measuring only $5\times10^{-7}$, which is a value much less than the Sendust sample 1. The saturation magnetic flux density of the samples 7 and 8 is also higher than the Sendust sample 1.

Samples 9 to 14 are of compositions which are also defined according to this invention, in which a rare earth element such as Ce, Sm and Dy is added in addition to Ag or Cu. The addition of the rare earth element further decreases the magnetostriction of the samples 7 and 8 without deteriorating the magnetic property. The corrosion resistance is improved further to give about the same value as the Sendust sample 1.

Samples 15 to 18 are formed by removing oxygen from the compositions of the samples 9 to 14. The removal of oxygen lessens the corrosion resistance improving effect. When a rare earth element is added further along with Ag or Cu and with oxygen also further added, the corrosion resistance is improved and the magnetostriction of the film thus obtained decreases from that of the film formed without the further addition. The reason for this effect is unknown. As to the corrosion resistance, however, it seems that the addition of these elements brings about an effect of suppressing the direct oxidation of Fe.

TABLE 1

| Sample No. | Composition (atomic %) | Bs (T) | Hc (Oe) | μ 1 MHz | Magneto-striction ($10^{-7}$) | Corrosion Resistance |
|---|---|---|---|---|---|---|
| 1. | $Fe_{74.6}Si_{16.6}Al_{8.8}$ | 1.10 | 0.40 | 2500 | 16 | 86.6 |
| 2. | $Fe_{75.3}Ta_{5.2}Nb_{1.7}C_{12.1}O_{5.7}$ | 1.61 | 0.38 | 3540 | 2 | 5.6 |
| 3. | $Fe_{71.2}Ta_{5.0}Nb_{1.6}C_{11.5}O_{5.6}Cr_{4.1}$ | 1.52 | 0.50 | 2600 | 20 | 79.5 |
| 4. | $Fe_{72.9}Ta_{5.0}Nb_{1.6}C_{11.4}O_{5.6}Ru_{3.5}$ | 1.48 | 0.91 | 1500 | 50 | 76.0 |
| 5. | $Fe_{66.5}Al_{9.5}Ta_{5.0}Nb_{1.6}C_{11.8}O_{5.6}$ | 1.48 | 0.30 | 3700 | 10 | 45.0 |
| 6. | $Fe_{63.4}Al_{13.0}Ta_{4.9}Nb_{1.6}C_{11.6}O_{5.5}$ | 1.32 | 0.49 | 2000 | 30 | 86.0 |
| 7. | $Fe_{66.3}Al_{9.5}Ta_{5.0}Nb_{1.6}C_{11.8}O_{5.6}Ag_{0.2}$ | 1.47 | 0.30 | 4500 | 5 | 71.0 |
| 8. | $Fe_{66.3}Al_{9.5}Ta_{5.0}Nb_{1.6}C_{11.8}O_{5.6}Cu_{0.2}$ | 1.47 | 0.30 | 4400 | 5 | 65.0 |
| 9. | $Fe_{66.1}Al_{9.5}Ta_{5.0}Nb_{1.6}C_{11.8}O_{5.6}Ag_{0.2}Ce_{0.2}$ | 1.53 | 0.27 | 4270 | 4 | 91.4 |
| 10. | $Fe_{66.1}Al_{9.5}Ta_{5.0}Nb_{1.6}C_{11.8}O_{5.6}Ag_{0.2}Sm_{0.2}$ | 1.46 | 0.48 | 3510 | 2 | 79.8 |
| 11. | $Fe_{66.0}Al_{9.5}Ta_{5.0}Nb_{1.6}C_{11.8}O_{5.6}Ag_{0.2}Dy_{0.3}$ | 1.41 | 0.50 | 3710 | 2 | 93.1 |
| 12. | $Fe_{66.0}Al_{9.5}Ta_{5.0}Nb_{1.6}C_{11.8}O_{5.6}Cu_{0.2}Ce_{0.3}$ | 1.47 | 0.80 | 2020 | 3 | 87.2 |
| 13. | $Fe_{66.0}Al_{9.5}Ta_{5.0}Nb_{1.6}C_{11.8}O_{5.6}Cu_{0.2}Sm_{0.3}$ | 1.44 | 0.32 | 4230 | 2 | 78.4 |
| 14. | $Fe_{66.0}Al_{9.5}Ta_{5.0}Nb_{1.6}C_{11.8}O_{5.6}Cu_{0.2}Dy_{0.3}$ | 1.48 | 0.48 | 4620 | 2 | 86.0 |
| 15. | $Fe_{71.9}Al_{9.5}Ta_{5.0}Nb_{1.6}C_{11.8}Ag_{0.2}$ | 1.49 | 0.42 | 3450 | 2 | 69.6 |
| 16. | $Fe_{71.9}Al_{9.5}Ta_{5.0}Nb_{1.6}C_{11.8}Cu_{0.2}$ | 1.50 | 0.52 | 3720 | 2 | 64.0 |
| 17. | $Fe_{71.7}Al_{9.5}Ta_{5.0}Nb_{1.6}C_{11.8}Ag_{0.2}Ce_{0.2}$ | 1.54 | 0.42 | 3830 | 2 | 72.0 |
| 18. | $Fe_{71.7}Al_{9.5}Ta_{5.0}Nb_{1.6}C_{11.8}Cu_{0.2}Ce_{0.2}$ | 1.52 | 0.51 | 3650 | 2 | 71.0 |

Referring to Table 1 above, a sample 1 is a film of a standard Sendust composition. The value of corrosion resistance of the sample 1 was found to be 86.6%.

A sample 2 is a film formed by adding oxygen to an "Fe MI C" system. This film excels in magnetic property but has a poor corrosion resistance measuring 5.6%.

As described above, each of the samples 7 to 14 of compositions which are defined according to this invention excels in corrosion resistance like the Sendust thin-film and is superior to the Sendust thin-film in magnetically soft property and saturation magnetic flux density. Besides, it has a lower magnetostriction.

The magnetically soft thin-film of a composition defined according to this invention either may be a single layer film or may be a multilayer film formed, for example, by laminating a magnetic metal film such as permalloy of Co-amorphous film, a nonmagnetic metal film of Ag or Cu and a ceramic film of Si—N, $SiO_2$ or the like one on top of another.

A structural arrangement in which the above-stated magnetically soft thin-film is applied to a magnetic head is next described as follows.

Figure 3:
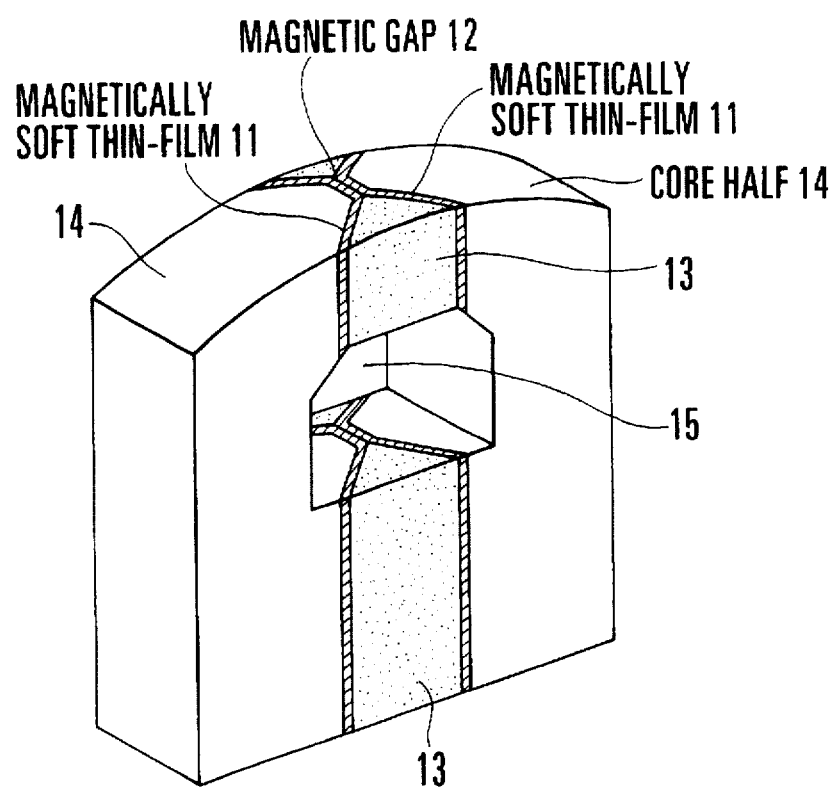
FIG. 3 is an oblique view showing a magnetic core of the magnetic head prepared with the magnetically soft thin-film which is the embodiment of this invention.

Recording/reproduction tests were conducted by applying the magnetically soft thin-film of each of the samples 7 to 14, which are typically defined according to this invention, to the magnetic core of a metal-in-gap head as shown in FIG. 3. These tests were carried on over a long period of time using a metal tape of coercive force 1500 [Oe]. For comparison, the Sendust sample 1 and the sample 2 which is formed by adding oxygen to an "Fe MI C" system were also subjected to the recording/reproduction tests.

The magnetic core shown in FIG. 3 is composed of a pair of core halves 14 which are made of a single-crystal Mn—Zn ferrite. The magnetic core is formed by opposing the core halves 14 to each other across a magnetic gap 12 made of $SiO_2$ and $Cr_2O_3$ and by joining them together with welding glass 13. The magnetically soft thin-film 11 is formed on each of the confronting faces of the core halves 14 which are opposed to each other across the magnetic gap 12. A coil winding which is not shown is provided around the magnetic core through a window 15 which is formed in the magnetic core for the coil winding. The recording/ reproduction tests were conducted, as described below, with each of the samples 1, 2 and 7 to 14 described in the foregoing formed as the magnetically soft thin-film 11.

While air-conditioned tests were in process at temperature of 80° C. and at humidity of 90%, recording and reproducing characteristics were periodically measured and reproduction outputs were examined for changes. The results of the tests are as shown in Table 2 below. In Table 2, figures show changes of reproduction outputs in percentage as computed from (Vt/V0)×100, wherein Vt represents a reproduction output voltage obtained after the lapse of each of various lengths of time and V0 represents an initial reproduction output voltage. These values correspond to the corrosion resistance of the magnetic head under high temperature and high humidity conditions.

As apparent from Table 2 above, the reproduction output voltage of the magnetic head using the sample 2 greatly drops after the lapse of 1000 hours. In the case of the magnetic heads using the samples 7 and 8 which are formed either by adding Al and Ag or by adding Al and Cu, the reproduction voltage drops only 76% and 79%, indicating a considerable improvement in properties.

In the case of the magnetic heads using the samples 9 to 14 which are formed either by adding Al, Ag and the rare earth element or by adding Al, Cu and the rare earth element, their properties are about the same as those of the magnetic head using the Sendust thin-film.

The corrosion resistance under high temperature and high humidity conditions of the magnetically soft thin-films according to this invention is, therefore, almost the same as the Sendust thin-film. Besides, as mentioned in the foregoing, they are superior to the Sendust film in saturation magnetic flux density, permeability and low magnetostriction, so that magnetic heads of high performance can be obtained by using these thin films.

The magnetically soft thin-film according to this invention is applicable not only to a metal-in-gap magnetic head but also to the magnetic heads of other types, including a laminated head which has the whole magnetic path of a magnetic core composed of a plurality of laminated magnetically soft thin-films and a thin-film magnetic head which has its whole head body composed of thin films. In other words, a magnetic head of high performance can be obtained by forming at least a part of its magnetic core with the magnetically soft thin-film which is prepared in accordance with this invention.

According to the arrangement of the embodiment of this invention, as apparent from the foregoing description, a magnetically soft thin-film is prepared either to be of a composition wherein Fe is used as a principal component, and 0.5 to 20 atomic % of Al, 2 to 25 atomic % of at least one of Zr, Hf, Nb, Ta, Mo and W, 0.05 to 5 atomic % of at lease one of Ag and Cu, 0.5 to 25 atomic % of C and 0.2 to 8 atomic % of O are added as additional elements to the principal component, or to be of a composition wherein 0.1 to 5 atomic % of at least one of rare earth elements such as Ce, Sm and Dy is added further to the above-stated composition. These compositions enable the magnetically soft thin-film not only to have excellent corrosion resistance which is about the same as that of the Sendust film but also

TABLE 2

| Sample No. | Composition (atomic %) | Time elapsed (H) | | | | |
|---|---|---|---|---|---|---|
| | | 0 | 200 | 500 | 700 | 1000 |
| 1. | $Fe_{74.6}Si_{16.6}Al_{8.8}$ | 100 | 99 | 92 | 90 | 87 |
| 2. | $Fe_{75.3}Ta_{5.2}Nb_{1.7}C_{12.1}O_{5.7}$ | 100 | 50 | 19 | 6 | 3 |
| 7. | $Fe_{66.3}Al_{9.5}Ta_{5.0}Nb_{1.6}C_{11.8}O_{5.6}Ag_{0.2}$ | 100 | 96 | 90 | 86 | 79 |
| 8. | $Fe_{66.3}Al_{9.5}Ta_{5.0}Nb_{1.6}C_{11.8}O_{5.6}Cu_{0.2}$ | 100 | 96 | 89 | 85 | 76 |
| 9. | $Fe_{66.1}Al_{9.5}Ta_{5.0}Nb_{1.6}C_{11.8}O_{5.6}Ag_{0.2}Ce_{0.2}$ | 100 | 98 | 93 | 89 | 86 |
| 10. | $Fe_{66.1}Al_{9.5}Ta_{5.0}Nb_{1.6}C_{11.8}O_{5.6}Ag_{0.2}Sm_{0.2}$ | 100 | 99 | 90 | 87 | 85 |
| 11. | $Fe_{66.0}Al_{9.5}Ta_{5.0}Nb_{1.6}C_{11.8}O_{5.6}Ag_{0.2}Dy_{0.3}$ | 100 | 96 | 94 | 91 | 89 |
| 12. | $Fe_{66.0}Al_{9.5}Ta_{5.0}Nb_{1.6}C_{11.8}O_{5.6}Cu_{0.2}Ce_{0.3}$ | 100 | 94 | 90 | 86 | 83 |
| 13. | $Fe_{66.0}Al_{9.5}Ta_{5.0}Nb_{1.6}C_{11.8}O_{5.6}Cu_{0.2}Sm_{0.3}$ | 100 | 95 | 91 | 87 | 83 |
| 14. | $Fe_{66.0}Al_{9.5}Ta_{5.0}Nb_{1.6}C_{11.8}O_{5.6}Cu_{0.2}Dy_{0.3}$ | 100 | 97 | 95 | 90 | 89 | to be superior to the Sendust film in respect of a magnetically soft property, a high saturation magnetic flux density and a low magnetostriction.

Further, the use of the magnetically soft thin-film according to this invention in forming a magnetic core at least in part gives a practical, high performance magnetic head which excels in corrosion resistance under high temperature and high humidity conditions.

What is claimed is:

1. A magnetic alloy characterized by being made of a magnetically soft material of a composition expressed by the following composition formula:

$$(Fe)_a(Al)_b(Ta+Nb)_c(MII)_d(C)_e(O)_f$$

where a, b, c, d, e and f respectively represent values of composition ratio in atomic percentage. MII represents at least one of elements Ag and Cu, and said values a, b, c, d, e and f satisfy the following conditions:

a+b+c+d+e+f=100

$0.5 \geq b \geq 20$ $2 \geq c \geq 25$ $0.05 \geq d \geq 5$ $0.5 \geq e \geq 25$ $0.2 \geq f \geq 8$.

2. A magnetic alloy according to claim 1, wherein said MII represents Ag.

3. A magnetic alloy according to claim 1, wherein said MII represents Cu.

4. A magnetic alloy characterized by being made of a magnetically soft material of a composition expressed by the following composition formula:

$$(Fe)_a(Al)_b(Ta+Nb)_c(MII)_d(C)_e(O)_f(L)_g$$

where a, b, c, d, e, f and g respectively represent values of composition ratio in atomic percentage. MII represents at least one of elements Ag and Cu, L represents at least one of rare earth elements and said values a, b, c, d, e, f and g satisfy the following conditions:

a+b+c+d+e+f+g=100

$0.5 \geq b \geq 20$ $2 \geq c \geq 25$ $0.05 \geq d \geq 5$ $0.5 \geq e \geq 25$ $0.2 \geq f \geq 8$ $0.1 \geq g \geq 5$.

5. A magnetic alloy according to claim 4, wherein said MII represents Ag.

6. A magnetic alloy according to claim 5, wherein said L represents Ce.

7. A magnetic alloy according to claim 5, wherein said L represents Sm.

8. A magnetic alloy according to claim 5, wherein said L represents Dy.

9. A magnetic alloy according to claim 4, wherein said MII represents Cu.

10. A magnetic alloy according to claim 9, wherein said L represents Ce.

11. A magnetic alloy according to claim 9, wherein said L represents Sm.

12. A magnetic alloy according to claim 9, wherein said L represents Dy.

13. A magnetic head comprising:

a magnetic core having at least a part made of a magnetic alloy thin film; and said magnetic alloy being made of a magnetically soft material of a composition expressed by the following composition formula:

$$(Fe)_a(Al)_b(Ta+Nb)_c(MII)_d(C)_e(O)_f$$

where a, b, c, d, e and f respectively represent values of composition ratio in atomic percentage. MII represents at least one of elements Ag and Cu, and said values a, b, c, d, e and f satisfy the following conditions:

a+b+c+d+e+f=100

$0.5 \geq b \geq 20$ $2 \geq c \geq 25$ $0.05 \geq d \geq 5$ $0.5 \geq e \geq 25$ $0.2 \geq f \geq 8$.

14. A magnetic head according to claim 13, wherein said magnetic alloy is formed on said magnetic core as a thin film.

15. A magnetic head comprising:

a magnetic core having at least a part made of a magnetic alloy thin film; and said magnetic alloy being made of a magnetically soft material of a composition expressed by the following composition formula:

$$(Fe)_a(Al)_b(Ta+Nb)_c(MII)_d(C)_e(O)_f(L)_g$$

where a, b, c, d, e, f and g respectively represent values of composition ratio in atomic percentage. MII represents at least one of elements Ag and Cu, L represents at least one of rare earth elements, and said values a, b, c, d, e, f and g satisfy the following conditions:

a+b+c+d+e+f+g=100

$0.5 \geq b \geq 20$ $2 \geq c \geq 25$ $0.05 \geq d \geq 5$ $0.5 \geq e \geq 25$ $0.2 \geq f \geq 8$ $0.1 \geq g \geq 5$.

16. A magnetic head according to claim 15, wherein said magnetic alloy is formed on said magnetic core as a thin film.

* * * * *